Dec. 20, 1960     L. A. SUMMERS     2,965,329
ROD TIP LINE RECEPTACLE
Filed March 23, 1956
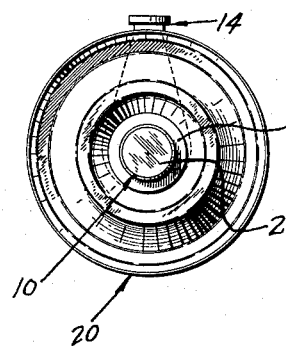
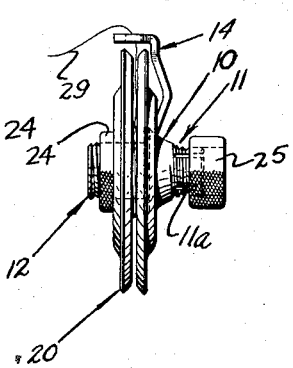
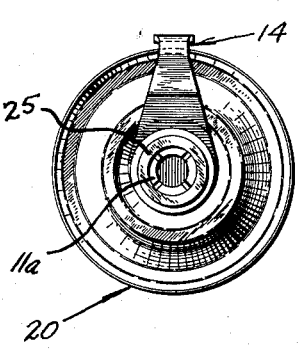
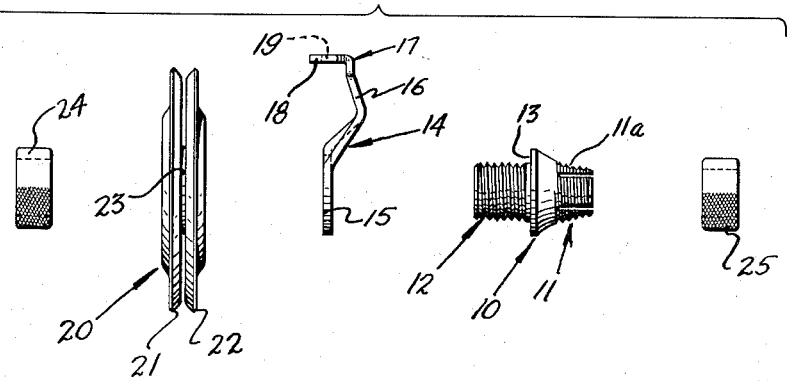
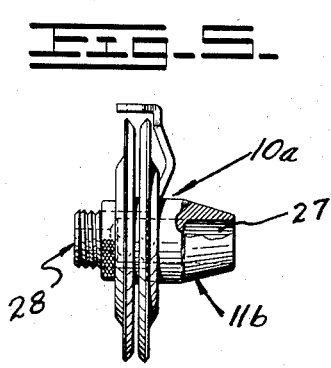
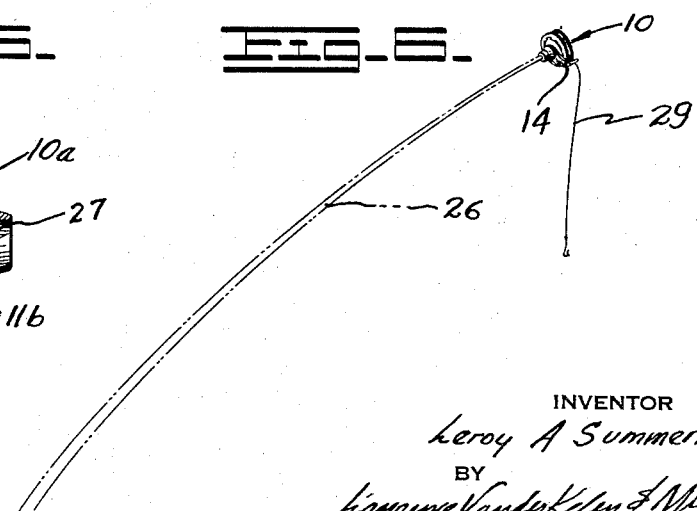
INVENTOR
Leroy A Summers
BY
ATTORNEY

United States Patent Office 2,965,329
Patented Dec. 20, 1960

2,965,329

ROD TIP LINE RECEPTACLE

Leroy A. Summers, 825 Kent St., Portland, Mich.

Filed Mar. 23, 1956, Ser. No. 573,503

2 Claims. (Cl. 242—84.1)

The present invention relates to reels for fishing rods and is more particularly concerned with a rotatable line reel for fishing rods removably attached to the tip of a fishing rod. The present invention has particular adaptability to that form of fishing wherein a long relatively inflexible pole of cane or bamboo is used to hang a short line having a hook at its end into a stream or river from the river bank.

It is an object of the present invention to provide a fishing line receptacle removably attachable to the tip of a fishing rod or pole.

It is a further object of the present invention to provide a means for quickly and easily changing the length of line hanging from the end of a pole.

Another object of the present invention is to provide a fishing line receptacle which is inexpensive to manufacture, easily assembled and durable.

It is another object of the present invention to eliminate tying, cutting, splicing and the like of line used by bank or still fisherman.

A still further object of the present invention is to provide a reel which is secured against dislodgement from the rod.

It is a further object of the present invention to provide a reel which permits accurate reeling and unreeling of line, quick and easy exchange of weight, braid size and type of line while in the stream, and quick exchange of reel from rod to rod.

These and other objects will become apparent to those skilled in the art as the description proceeds with reference to the drawings.

In the drawings:

Figure 1 is a front elevation of the rod tip reel in accord with the present invention showing the ferrule and the receptacle lock, line receptacle and line guide.

Figure 2 is a side elevation of the rod tip reel in accord with the present invention showing the split ferrule, ferrule lock nut, receptacle lock, line receptacle, line guide and a line through the guide.

Figure 3 is a rear elevation of the rod tip reel in accord with the present invention showing the split after end of the ferrule, the tapered lock nut, the line receptacle and the line guide.

Figure 4 is an "exploded" view of the rod tip reel in accord with the present invention showing each part in side elevation in order of assembly on the ferrule.

Figure 5 is a side view of the rod tip reel in accord with the present invention showing a modified ferrule body for attachment to a rod tip by cementing or the like.

Figure 6 shows the rod tip reel of the present invention attached to a rod which is shown in phantom line.

General description

The present invention provides a rod tip line reel for fishing poles comprising a rod tip ferrule; a line guide; and, a line receptacle movably selectively lockable and unlockable against rotation on said ferrule. The ferrule is provided with an enlarged diameter mid-portion; an externally threaded tapered split after body portion and a threaded forebody. The forebody portion is of a substantially smaller diameter than the ferrule body mid-portion. The difference in diameter forms the mid-portion of said ferrule in a shoulder relative to said threaded forebody portion. The line guide is of generally annular shape and is rotatably mounted over said threaded forebody portion in circumferential surface abutting relation to the ferrule mid-portion shoulder. The line guide has an arm extending radially from the annulus which arm terminates in a right annular bent portion. The so-formed end portion of the arm has a line hole centrally positioned therethrough. The line receptacle has a generally spool shape and is mounted over the threaded forebody portion of the ferrule. The spool has a pair of resilient flanges integrally secured thereon in a normally spaced apart manner. The line receptacle spool selectively abuts into and out of frictional contact with said line guide. A line receptacle lock generally comprising an internally threaded nut is matingly threaded onto said threaded forebody portion of the ferrule to selectively urge said line receptacle and said line guide into and out of abutting frictional engagement with each other and simultaneously urge the line guide into and out of abutting frictional relation with the shoulder of the ferrule thus selectively locking and unlocking said line receptacle against rotation on the forebody portion of the ferrule. An internally tapered threaded draw nut is matingly threaded over the tapered split afterbody of the ferrule to accomplish compression of the split fingers. The resultant displacement of the finger accomplishes attachment of the ferrule to a generally cylindrical surface of a fishing rod tip. Thus there is provided a fishing line storage receptacle for bamboo poles and the like. The line receptacle is selectively lockable and unlockable against rotation and the reel per se is removably attachable to a fishing rod tip. This combination makes continuous incremental line lengths easy and quick pole change readily available to the fisherman.

Specific description

With reference being had to the accompanying drawings the rod tip reel of the present invention comprises a ferrule 10 having an enlarged diameter mid-portion. The after end 11 of the ferrule is threaded, tapered and split to form a plurality of flexible fingers 11a. The forebody 12 of the ferrule 10 is threaded and of substantially smaller diameter than the mid portion of the ferrule 10 so as to form a shoulder 13 relative to and facing the threaded forebody 12. A line guide 14 is provided which has an annular shaped body 15 and an arm 16 extending radially therefrom. Said arm 16 is provided near its radial extremity 17 with a right angular projection 18. The projection 18 has a line hole 19 therethrough. The annulus 15 of line guide 14 is of a sufficient inner diameter to rotate freely about the threaded forebody portion 12 of the ferrule 10 when the line guide 14 is positioned over the forebody portion 12. A line receptacle 20 is provided, having two resilient normally spaced apart disk-like flanges 21 and 22 positioned one on each end of a spool 23 so as to extend circumferentially from the spool 23. The spool 23 is positioned adjacent to the line guide 14. The spool 23 has an inner diameter of such size as to rotate freely on the threaded forebody portion 12 of the ferrule 10 when the spool 23 is positioned over the threaded forebody portion 12 of ferrule 10. An internally threaded line receptacle lock 24 is matingly threaded onto the forebody portion 12 of ferrule 10 to selectively urge the line receptacle 20 into and out of circumferential frictional surface abutting relation with line guide 14. Simultaneously with such movement the line annular surface guide 14 is moved selectively into and out of circumferential frictional abutting relation with shoulder 13 of ferrule 10. An internally tapered threaded lock nut 25 is matingly threaded over the tapered split after end portion 11 of ferrule 10 to accomplish attachment to a generally cylindrical surface of a rod 26 by compressing the fingers 11a inwardly as the nut is tightened onto the split after end 11.

Various modifications can be made in the means and method of accomplishing the attachment of the ferrule 10 to a generally cylindrical surface 26. For example, the after end 11 of the ferrule 10 may be modified as shown in Figure 5, to comprise a ferrule 10a having an after end 11b which does not have a split end but which has a tapered exterior shape and a regular diameter hole 27 extending to the mid-portion of the ferrule 10a. The modified ferrule 10a is secured to a rod tip, for example, by gluing or cementing. The after end 11b may be further modified to accommodate a set screw (not shown) or a pair of set screws by drilling a hole or holes (not shown) through the body and tapping the so-drilled holes to matingly threadably receive a set screw or screws. The set screw or screws when tightened down will bear against and into the rod surface and hold the ferrule against dislodgement from the rod tip. Again, the ferrule may be modified by using either the ferrule 10 shown in Figure 4 or the body 10a shown in Figure 5 by drilling a hole (not shown) through the fore face 28 of the forebody portion 12. A long screw is inserted through the hole and engages a tapered plug (not shown) in threadable relationship. The plug preferably is of a size easily insertable into a rod tip and will expand into the pole as the screw is turned drawing the plug towards the ferrule thus urging the pole body outwardly against the ferrule body. The plug when so-positioned and when fully drawn into the area beneath the ferrule end will cause the circumferential rod surface to become compressed between the plug and the ferrule inner surface. This manner of securing the ferrule against dislodgment is adaptable also to expanding anchor commonly employed in masonry work and commercially available in all sizes.

Modifications in other elements will be apparent to those skilled in the art. Size and shape of the members can be modified to accommodate various size rod tips and various sizes of line dictated by fishermen in catching the numerous game fish under varied conditions of weather, and terrain about the country.

*Operation*

The operation of the rod tip fishing reel of the present invention is generally in the following manner:

When it is desired to secure the reel shown in Figures 1, 2, 3 and 4 of the present invention to a fishing rod, for example, the bamboo pole type, the lock nut 25 of the tapered, split, threaded after end 11 of ferrule 10 is unscrewed until the fingers 11a are fully expanded providing a maximum opening of the ferrule 10. The ferrule 10 is slipped over the end of the bamboo fishing pole which has been previously prepared by removing the joint at the end of the pole. When the ferrule 10 is fully on the pole the lock nut 25 is tightened compressing the fingers 11a into contact with the circumferential surface of the rod securing the ferrule 10 to the rod tip against dislodgment. The line receptacle lock 24 is removed from the threaded forebody portion 12 and a reel 20 having fishing line 29 wound on the spool 23 is slipped onto and over the forebody 12 in abutting relation with the line guide 14 which has been preassembled over the forebody 12. The lock 24 is threaded onto and screwed down onto the forebody portion 12 until line receptacle 20 is securely held on the forebody 12 but free to rotate. The line 29 held on line receptacle 20 is reeled off of spool 23 until the end can easily be threaded through eye 19 of line guide 14. The rod and reel are now ready for use. The desired length of line is reeled off spool 23 of line receptacle 20 and the reel 20 locked against further rotation by screwing lock 24 down against the reel 20 urging reel 20 against line guide annular body 15 and causing line guide 14 to press and bear against shoulder 13 of ferrule 10, thus locking the spool 20, flanges 21 and 22 and line 29 against movement. The pole is now rigged with the desired length of line and ready for use.

When it is desired to shorten the length of line 29 or to stop fishing and reel in the line 29 lock 24 is loosened to allow free rotation of the reel 20 to reel in the line to the preferred new length or to bring the line in completely for storage on the spool 23.

When poles are changed it is a simple matter to unscrew lock nut 25 allowing the split after body 11 of ferrule 10 to expand and slip off the old pole. The new pole can be rigged in the same manner as before.

The spool 20 can be quickly changed by the fisherman by substituting another line receptacle without disturbing the ferrule positioning to vary line weight to meet selected stream conditions.

It is thus seen that there has been provided a rod tip fishing line reel which is quickly and easily attached to a pole and which permits line to be quickly and easily changed as to length or an entire new reel of line slipped on for use for larger fish.

I claim:

1. In a rod tip reel, the combination comprising: a tubular ferrule having a central section of enlarged diameter, a threaded forward section and a threaded tapered split after section, said forward threaded section being of substantially smaller diameter than said central section forming a shoulder; a line guide having an annular body portion and an arm extending radially therefrom, said arm being provided with a right angularly bent end portion having a line hole therethrough to receive a line, said annular body adapted to slip over said forward threaded section into abutting relation with said central section shoulder of said ferrule; a line receptacle having two resilient normally spaced apart flanges mounted on a spool, said spool freely rotatable on said forward threaded section; a line receptacle lock matingly threaded on said forward threaded section to urge said spool into and out of engagement with said line guide selectively locking and unlocking said line reel against rotation about said forward threaded section; and a tapered lock nut threadable over said split tapered after section compressing said split section to accomplish attachment of said ferrule to a generally cylindrical surface.

2. In a reel structure for attachment to a rod tip for carrying a line spool having a pair of spaced apart resilient line retaining flanges, the combination comprising: a tubular ferrule member having an enlarged central body portion, said ferrule being split longitudinally at one end and both ends thereof being threaded; a line guide in clearance relationship over said threads on said ferrule and shouldering against said enlarged central body portion of said ferrule, and extending radially therefrom; an internally threaded ring threadable on said unsplit end of said ferrule for tensionally securing a spool between said ring and said line guide; and an internally threaded ring over said split end of said ferrule for securing said ferrule to a rod tip.

References Cited in the file of this patent

UNITED STATES PATENTS

| 1,065,069 | Noble | June 17, 1913 |
| 1,177,636 | Kuehn | Apr. 4, 1916 |
| 1,405,300 | D'Eeckenbrugge | Jan. 31, 1922 |
| 1,785,027 | Gephart | Dec. 16, 1930 |
| 2,194,029 | Morehouse | Mar. 19, 1940 |
| 2,261,629 | Murphy | Nov. 4, 1941 |
| 2,465,471 | Packer | Mar. 29, 1949 |
| 2,563,148 | Zeller | Aug. 7, 1951 |
| 2,672,301 | Shelburne | Mar. 16, 1954 |

FOREIGN PATENTS

| 954,464 | France | June 13, 1949 |
| 966,346 | France | Mar. 1, 1950 |
| 1,104,028 | France | June 8, 1955 |